(12) United States Patent
Paluch, Jr. et al.

(10) Patent No.: US 6,323,868 B1
(45) Date of Patent: Nov. 27, 2001

(54) SYSTEM AND METHOD FOR FRAME AND FIELD MEMORY ACCESS IN A WIDE-WORD MEMORY

(75) Inventors: Edward John Paluch, Jr., Santa Clara; Kuei-Cheng Lin, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/238,233

(22) Filed: Jan. 27, 1999

(51) Int. Cl.[7] .................................................. G06F 12/06
(52) U.S. Cl. ........................................ 345/572; 345/556
(58) Field of Search ................................. 345/572, 556, 345/536–538, 501, 530, 573, 564, 566; 348/714–718

(56) References Cited

U.S. PATENT DOCUMENTS

| 5,241,663 | 8/1993 | Rohwer | 395/425 |
| 5,577,228 | 11/1996 | Banerjee et al. | 395/467 |
| 5,619,282 | * 4/1997 | Song | 348/716 |
| 5,708,849 | * 1/1998 | Coke et al. | 710/22 |
| 5,854,651 | * 12/1998 | Howard et al. | 345/517 |
| 5,999,693 | * 12/1999 | Juri et al. | 386/68 |

* cited by examiner

*Primary Examiner*—Kee M. Tung
(74) *Attorney, Agent, or Firm*—Gregory J. Koerner; Simon & Koerner LLP

(57) ABSTRACT

The present invention comprises an efficient system and method for reading and writing data from memory that is organized to represent either field or frame video data in a wide-word configured memory. A memory controller is configured to read or write either sequential wide-words or alternate wide-words in a DMA transfer as directed by software. After the DMA transfer is initiated, the memory read or write operations proceed automatically until the DMA transfer is completed. The ability to read or write either sequential or alternate wide-words beneficially supports operations to convert between field video data for interlaced video displays and frame video data for progressive-scan displays.

40 Claims, 9 Drawing Sheets

| 310 | 312 | 314 | 316 | 318 | 320 | 322 | 324 |
|---|---|---|---|---|---|---|---|
| 000 - 003 | 004 - 007 | 080 - 083 | 084 - 087 | 100 - 103 | 104 - 107 | 180 - 183 | 184 - 187 |
| 008 - 00b | 00c - 00f | 088 - 08b | 08c - 08f | 108 - 10b | 10c - 10f | 188 - 18b | 18c - 18f |
| 010 - 013 | 014 - 017 | 090 - 093 | 094 - 097 | 110 - 113 | 114 - 117 | 190 - 193 | 194 - 197 |
| 018 - 01b | 01c - 01f | 098 - 09b | 09c - 09f | 118 - 11b | 11c - 11f | 198 - 19b | 19c - 19f |
| 020 - 023 | 024 - 027 | 0a0 - 0a3 | 0a4 - 0a7 | 120 - 123 | 124 - 127 | 1a0 - 1a3 | 1a4 - 1a7 |
| 028 - 02b | 02c - 02f | 0a8 - 0ab | 0ac - 0af | 128 - 12b | 12c - 12f | 1a8 - 1ab | 1ac - 1af |
| 030 - 033 | 034 - 037 | 0b0 - 0b3 | 0b4 - 0b7 | 130 - 133 | 134 - 137 | 1b0 - 1b3 | 1b4 - 1b7 |
| 038 - 03b | 03c - 03f | 0b8 - 0bb | 0bc - 0bf | 138 - 13b | 13c - 13f | 1b8 - 1bb | 1bc - 1bf |
| 040 - 043 | 044 - 047 | 0c0 - 0c3 | 0c4 - 0c7 | 140 - 143 | 144 - 147 | 1c0 - 1c3 | 1c4 - 1c7 |
| 048 - 04b | 04c - 04f | 0c8 - 0cb | 0cc - 0cf | 148 - 14b | 14c - 14f | 1c8 - 1cb | 1cc - 1cf |
| 050 - 053 | 054 - 057 | 0d0 - 0d3 | 0d4 - 0d7 | 150 - 153 | 154 - 157 | 1d0 - 1d3 | 1d4 - 1d7 |
| 058 - 05b | 05c - 05f | 0d8 - 0db | 0dc - 0df | 158 - 15b | 15c - 15f | 1d8 - 1db | 1dc - 1df |
| 060 - 063 | 064 - 067 | 0e0 - 0e3 | 0e4 - 0e7 | 160 - 163 | 164 - 167 | 1e0 - 1e3 | 1e4 - 1e7 |
| 068 - 06b | 06c - 06f | 0e8 - 0eb | 0ec - 0ef | 168 - 16b | 16c - 16f | 1e8 - 1eb | 1ec - 1ef |
| 070 - 073 | 074 - 077 | 0f0 - 0f3 | 0f4 - 0f7 | 170 - 173 | 174 - 177 | 1f0 - 1f3 | 1f4 - 1f7 |
| 078 - 07b | 07c - 07f | 0f8 - 0fb | 0fc - 0ff | 178 - 17b | 17c - 17f | 1f8 - 1fb | 1fc - 1ff |

Rows: 340, 342, 344, 346, 348, 350, 352, 354, 356, 358, 360, 362, 364, 366, 368, 370

FIG. 3

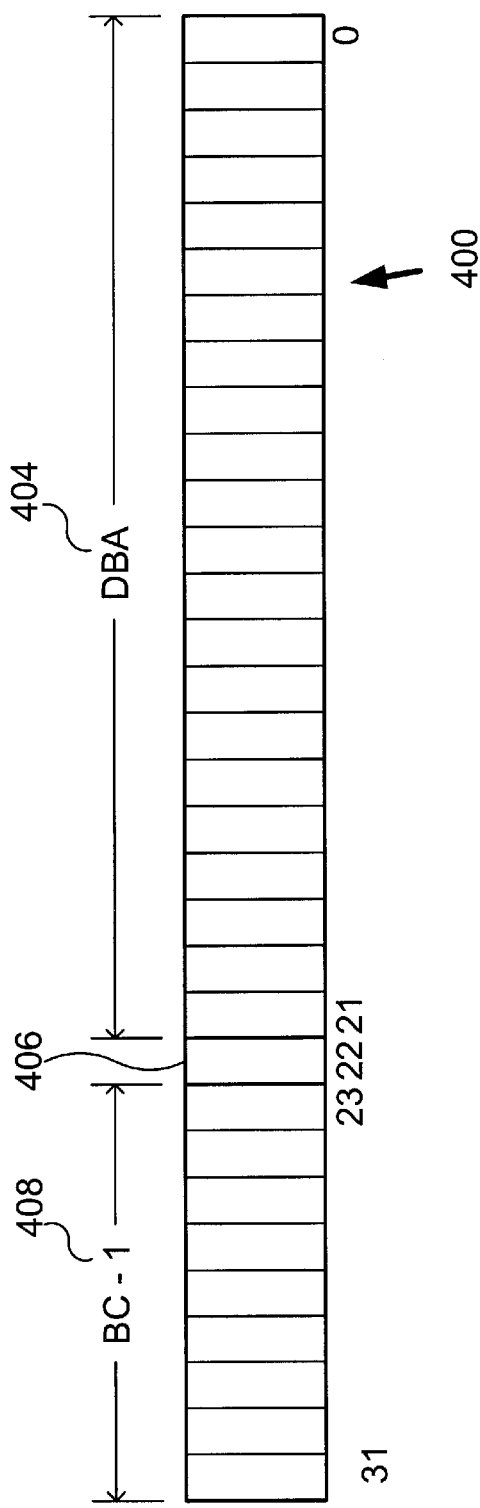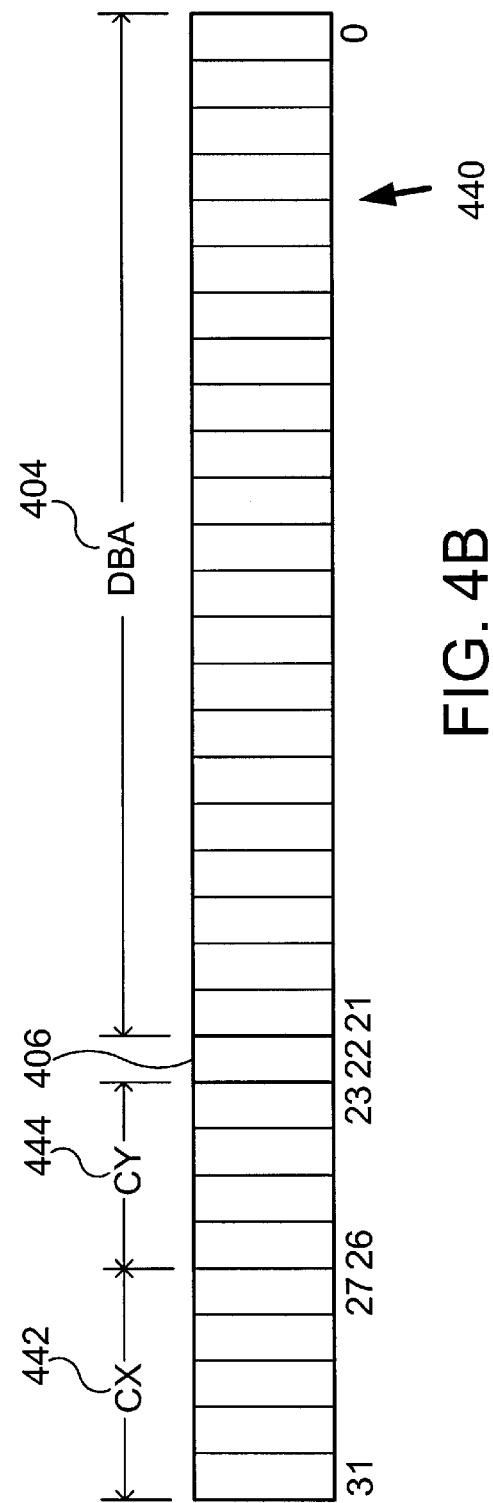

| | | | | | | |
|---|---|---|---|---|---|---|
| 000 - 003 | 004 - 007 | 080 - 083 | 084 - 087 | 100 - 103 | 104 - 107 | 180 - 183 | 184 - 187 |
| 008 - 00b | 00c - 00f | 088 - 08b | 08c - 08f | 108 - 10b | 10c - 10f | 188 - 18b | 18c - 18f |
| 010 - 013 | 014 - 017 | 090 - 093 | 094 - 097 | 110 - 113 | 114 - 117 | 190 - 193 | 194 - 197 |
| 018 - 01b | 01c - 01f | 098 - 09b | 09c - 09f | 118 - 11b | 11c - 11f | 198 - 19b | 19c - 19f |
| 020 - 023 | 024 - 027 | 0a0 - 0a3 | 0a4 - 0a7 | 120 - 123 | 124 - 127 | 1a0 - 1a3 | 1a4 - 1a7 |
| 028 - 02b | 02c - 02f | 0a8 - 0ab | 0ac - 0af | 128 - 12b | 12c - 12f | 1a8 - 1ab | 1ac - 1af |
| 030 - 033 | 034 - 037 | 0b0 - 0b3 | 0b4 - 0b7 | 130 - 133 | 134 - 137 | 1b0 - 1b3 | 1b4 - 1b7 |
| 038 - 03b | 03c - 03f | 0b8 - 0bb | 0bc - 0bf | 138 - 13b | 13c - 13f | 1b8 - 1bb | 1bc - 1bf |
| 040 - 043 | 044 - 047 | 0c0 - 0c3 | 0c4 - 0c7 | 140 - 143 | 144 - 147 | 1c0 - 1c3 | 1c4 - 1c7 |
| 048 - 04b | 04c - 04f | 0c8 - 0cb | 0cc - 0cf | 148 - 14b | 14c - 14f | 1c8 - 1cb | 1cc - 1cf |
| 050 - 053 | 054 - 057 | 0d0 - 0d3 | 0d4 - 0d7 | 150 - 153 | 154 - 157 | 1d0 - 1d3 | 1d4 - 1d7 |
| 058 - 05b | 05c - 05f | 0d8 - 0db | 0dc - 0df | 158 - 15b | 15c - 15f | 1d8 - 1db | 1dc - 1df |
| 060 - 063 | 064 - 067 | 0e0 - 0e3 | 0e4 - 0e7 | 160 - 163 | 164 - 167 | 1e0 - 1e3 | 1e4 - 1e7 |
| 068 - 06b | 06c - 06f | 0e8 - 0eb | 0ec - 0ef | 168 - 16b | 16c - 06f | 1e8 - 1eb | 1ec - 1ef |
| 070 - 073 | 074 - 077 | 0f0 - 0f3 | 0f4 - 0f7 | 170 - 173 | 174 - 177 | 1f0 - 1f3 | 1f4 - 1f7 |
| 078 - 07b | 07c - 07f | 0f8 - 0fb | 0fc - 0ff | 178 - 17b | 17c - 17f | 1f8 - 1fb | 1fc - 1ff |

| | | | | | | |
|---|---|---|---|---|---|---|
| 000 - 003 | 004 - 007 | 080 - 083 | 084 - 087 | 100 - 103 | 104 - 107 | 180 - 183 | 184 - 187 |
| 008 - 00b | 00c - 00f | 088 - 08b | 08c - 08f | 108 - 10b | 10c - 10f | 188 - 18b | 18c - 18f |
| 010 - 013 | 014 - 017 | 090 - 093 | 094 - 097 | 110 - 113 | 114 - 117 | 190 - 193 | 194 - 197 |
| 018 - 01b | 01c - 01f | 098 - 09b | 09c - 09f | 118 - 11b | 11c - 11f | 198 - 19b | 19c - 19f |
| 020 - 023 | 024 - 027 | 0a0 - 0a3 | 0a4 - 0a7 | 120 - 123 | 124 - 127 | 1a0 - 1a3 | 1a4 - 1a7 |
| 028 - 02b | 02c - 02f | 0a8 - 0ab | 0ac - 0af | 128 - 12b | 12c - 12f | 1a8 - 1ab | 1ac - 1af |
| 030 - 033 | 034 - 037 | 0b0 - 0b3 | 0b4 - 0b7 | 130 - 133 | 134 - 137 | 1b0 - 1b3 | 1b4 - 1b7 |
| 038 - 03b | 03c - 03f | 0b8 - 0bb | 0bc - 0bf | 138 - 13b | 13c - 13f | 1b8 - 1bb | 1bc - 1bf |
| 040 - 043 | 044 - 047 | 0c0 - 0c3 | 0c4 - 0c7 | 140 - 143 | 144 - 147 | 1c0 - 1c3 | 1c4 - 1c7 |
| 048 - 04b | 04c - 04f | 0c8 - 0cb | 0cc - 0cf | 148 - 14b | 14c - 14f | 1c8 - 1cb | 1cc - 1cf |
| 050 - 053 | 054 - 057 | 0d0 - 0d3 | 0d4 - 0d7 | 150 - 153 | 154 - 157 | 1d0 - 1d3 | 1d4 - 1d7 |
| 058 - 05b | 05c - 05f | 0d8 - 0db | 0dc - 0df | 158 - 15b | 15c - 15f | 1d8 - 1db | 1dc - 1df |
| 060 - 063 | 064 - 067 | 0e0 - 0e3 | 0e4 - 0e7 | 160 - 163 | 164 - 167 | 1e0 - 1e3 | 1e4 - 1e7 |
| 068 - 06b | 06c - 06f | 0e8 - 0eb | 0ec - 0ef | 168 - 16b | 16c - 16f | 1e8 - 1eb | 1ec - 1ef |
| 070 - 073 | 074 - 077 | 0f0 - 0f3 | 0f4 - 0f7 | 170 - 173 | 174 - 177 | 1f0 - 1f3 | 1f4 - 1f7 |
| 078 - 07b | 07c - 07f | 0f8 - 0fb | 0fc - 0ff | 178 - 17b | 17c - 17f | 1f8 - 1fb | 1fc - 1ff |

FIG. 7

| | | | | | | |
|---|---|---|---|---|---|---|
| 000 - 003 | 004 - 007 | 080 - 083 | 084 - 087 | 100 - 103 | 104 - 107 | 180 - 183 | 184 - 187 |
| 008 - 00b | 00c - 00f | 088 - 08b | 08c - 08f | 108 - 10b | 10c - 10f | 188 - 18b | 18c - 18f |
| 010 - 013 | 014 - 017 | 090 - 093 | 094 - 097 | 110 - 113 | 114 - 117 | 190 - 193 | 194 - 197 |
| 018 - 01b | 01c - 01f | 098 - 09b | 09c - 09f | 118 - 11b | 11c - 11f | 198 - 19b | 19c - 19f |
| 020 - 023 | 024 - 027 | 0a0 - 0a3 | 0a4 - 0a7 | 120 - 123 | 124 - 127 | 1a0 - 1a3 | 1a4 - 1a7 |
| 028 - 02b | 02c - 02f | 0a8 - 0ab | 0ac - 0af | 128 - 12b | 12c - 12f | 1a8 - 1ab | 1ac - 1af |
| 030 - 033 | 034 - 037 | 0b0 - 0b3 | 0b4 - 0b7 | 130 - 133 | 134 - 137 | 1b0 - 1b3 | 1b4 - 1b7 |
| 038 - 03b | 03c - 03f | 0b8 - 0bb | 0bc - 0bf | 138 - 13b | 13c - 13f | 1b8 - 1bb | 1bc - 1bf |
| 040 - 043 | 044 - 047 | 0c0 - 0c3 | 0c4 - 0c7 | 140 - 143 | 144 - 147 | 1c0 - 1c3 | 1c4 - 1c7 |
| 048 - 04b | 04c - 04f | 0c8 - 0cb | 0cc - 0cf | 148 - 14b | 14c - 14f | 1c8 - 1cb | 1cc - 1cf |
| 050 - 053 | 054 - 057 | 0d0 - 0d3 | 0d4 - 0d7 | 150 - 153 | 154 - 157 | 1d0 - 1d3 | 1d4 - 1d7 |
| 058 - 05b | 05c - 05f | 0d8 - 0db | 0dc - 0df | 158 - 15b | 15c - 15f | 1d8 - 1db | 1dc - 1df |
| 060 - 063 | 064 - 067 | 0e0 - 0e3 | 0e4 - 0e7 | 160 - 163 | 164 - 167 | 1e0 - 1e3 | 1e4 - 1e7 |
| 068 - 06b | 06c - 06f | 0e8 - 0eb | 0ec - 0ef | 168 - 16b | 16c - 16f | 1e8 - 1eb | 1ec - 1ef |
| 070 - 073 | 074 - 077 | 0f0 - 0f3 | 0f4 - 0f7 | 170 - 173 | 174 - 177 | 1f0 - 1f3 | 1f4 - 1f7 |
| 078 - 07b | 07c - 07f | 0f8 - 0fb | 0fc - 0ff | 178 - 17b | 17c - 17f | 1f8 - 1fb | 1fc - 1ff |

SYSTEM AND METHOD FOR FRAME AND FIELD MEMORY ACCESS IN A WIDE-WORD MEMORY

BACKGROUND OF THE INVENTION

1. Field of the Invention

This invention relates generally to improvements in memory addressing, and relates more specifically to a system and method for frame and field memory access operations within a wide-word memory.

2. Description of the Background Art

Controllers for digital audio and digital video information must rapidly manipulate substantial amounts of data. A common architectural approach to facilitate this data manipulation is to organize the memory so that it transfers the data in wide words. In this manner, many bytes of data may be transferred simultaneously during a single memory access. It is desirable for direct memory access (DMA) transfers to be organized to allow multiple wide-word transfers with little intervention from functional units processing the digital audio and video.

One common format for storing and presenting digital audio and video information is Moving Picture Experts Group version 2 (MPEG-2). MPEG-2 has been chosen as the video format for digital video disks (DVD) and digital television (DTV). The MPEG-2 format achieves substantial data compression by recognizing the existence of spatial and temporal redundancy in moving pictures, and then omitting these redundant elements. Spatial redundancy is reduced by a process that includes performing a discrete cosine transform on a matrix of adjacent picture elements (pixels). The MPEG-2 specification has standardized the size of this matrix as 8-by-8 pixels, and named this matrix a "block". An MPEG-2 block should not be confused with an MPEG-2 "macroblock" used to reduce temporal redundancy. Because of the defined blocks in MPEG-2, manipulating arrays of data in memory corresponding to these blocks is an important consideration in digital video controllers for MPEG-2-formatted video.

A controller for MPEG-2 video on a DVD has an additional concern. A DVD player may be connected to either an interlaced or a non-interlaced (progressive-scan) video display. An interlaced video display shows two alternating fields of display lines, odd and even, to produce a single frame of video. A progressive-scan video display shows a single frame of consecutive display lines. An example of an interlaced video display is a standard analog television set, and an example of a progressive-scan video display is a computer display monitor. A recorded DVD disk may need to be displayed on either an interlaced or a progressive-scan display. For this reason, it may be necessary for a controller of MPEG-2 video on a DVD to rapidly convert digital data organized by frames (for progressive-scan displays) into digital data organized by fields (for interlaced displays). Therefore, techniques for rapidly manipulating substantial amounts of data remain a significant consideration in memory addressing operations.

SUMMARY OF THE INVENTION

The present invention comprises an efficient system and method for reading and writing data from memory which is organized to represent either field or frame video data in a wide-word configured memory. In one embodiment, a memory controller is configured to read or write either sequential wide-words or alternate wide-words in a direct-memory-access (DMA) transfer as directed by software. After the DMA transfer is initiated, the memory read or write operations proceed automatically until the DMA transfer is completed. The ability to read or write either sequential or alternate wide-words beneficially supports operations to convert between field video data for interlaced video displays and frame video data for progressive-scan displays.

In one embodiment of the present invention, a DMA transfer reads data from synchronous-dynamic-random-access-memory (SDRAM) and places the data into a video post-process filter within a controller for digital video disk (DVD) or digital video broadcast (DVB). A reduced-instruction-set-computer (RISC) central-processing-unit (CPU) within the controller preferably initiates a DMA transfer to the video post-processing filter by sending a 32-bit address to a memory arbitrator within a memory controller of the controller. Then a memory address generator within the memory controller generates a first individual address based upon contents of a dynamic-random-access-memory byte address (DBA) contained within the 32-bit address. An SDRAM interface within the memory controller asserts the individual address generated by the memory address generator and sends a wide-word containing a byte addressed by the individual address to the video post-processing filter.

The memory address generator then determines whether there are any additional wide-words to be transferred in the present DMA transfer by testing whether a byte count field is exhausted. If so, then the DMA transfer is complete. Conversely, if the byte count field is not exhausted, then the memory address generator similarly calculates a next individual address.

The memory address generator determines whether a current DMA transfer is of frame type or field type by testing whether a flag bit of 32-bit address equals 0. If so, then the DMA transfer is of field type, and the memory address generator therefore adds 10 hexadecimal to the current contents of the DBA. Conversely, if the flag bit equals 1, then the DMA transfer is of frame type, and the memory address generator therefore adds 08 hexadecimal to the current contents of the DBA. In either case, the memory address generator decrements the byte count field.

After the memory address generator has calculated the next individual address, the SDRAM interface again asserts an individual address and sends a wide-word containing a byte addressed by the individual address to the video post-processing filter. This process of generating individual addresses and reading from memory continues until the memory address generator determines that the byte count field is exhausted and thus that there are no additional wide-words to be transferred in the current DMA transfer.

The process described above applies equally for a memory write DMA transfer if the foregoing step describing a memory read is replaced with a similar step describing a memory write to a wide-word containing a byte addressed by an individual address from the video post-processing filter.

The present invention therefore provides a system and method for frame and field memory read and write operations within a wide-word organized memory.

BRIEF DESCRIPTION OF THE DRAWINGS

FIG. 3 is an exemplary memory configuration map, in accordance with two embodiments of the present invention;

FIGS. 4A and 4B are memory address bit-allocation diagrams, in accordance with two embodiments of the present invention;

FIG. 6 is a memory map for an exemplary frame access in the memory of FIG. 3, in accordance with one embodiment of the present invention;

FIG. 7 is a memory map for a first exemplary field access in the memory of FIG. 3, in accordance with one embodiment of the present invention;

FIG. 8 is a memory map for a second exemplary field access in the memory of FIG. 3, in accordance with one embodiment of the present invention.

DETAILED DESCRIPTION OF THE PREFERRED EMBODIMENT

The present invention relates to an improvement in memory addressing flexibility. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises an efficient system and method for reading and writing data from memory that is organized to represent either field or frame video data in a wide-word configured memory. A memory controller is preferably configured to read or write either sequential wide-words or alternate wide-words in a DMA transfer as directed by software. After the DMA transfer is initiated, the memory read or write operations proceed automatically until the DMA transfer is completed. The ability to read or write either sequential or alternate wide-words beneficially supports operations to convert between field video data for interlaced video displays and frame video data for progressive-scan displays.

Figure 1:
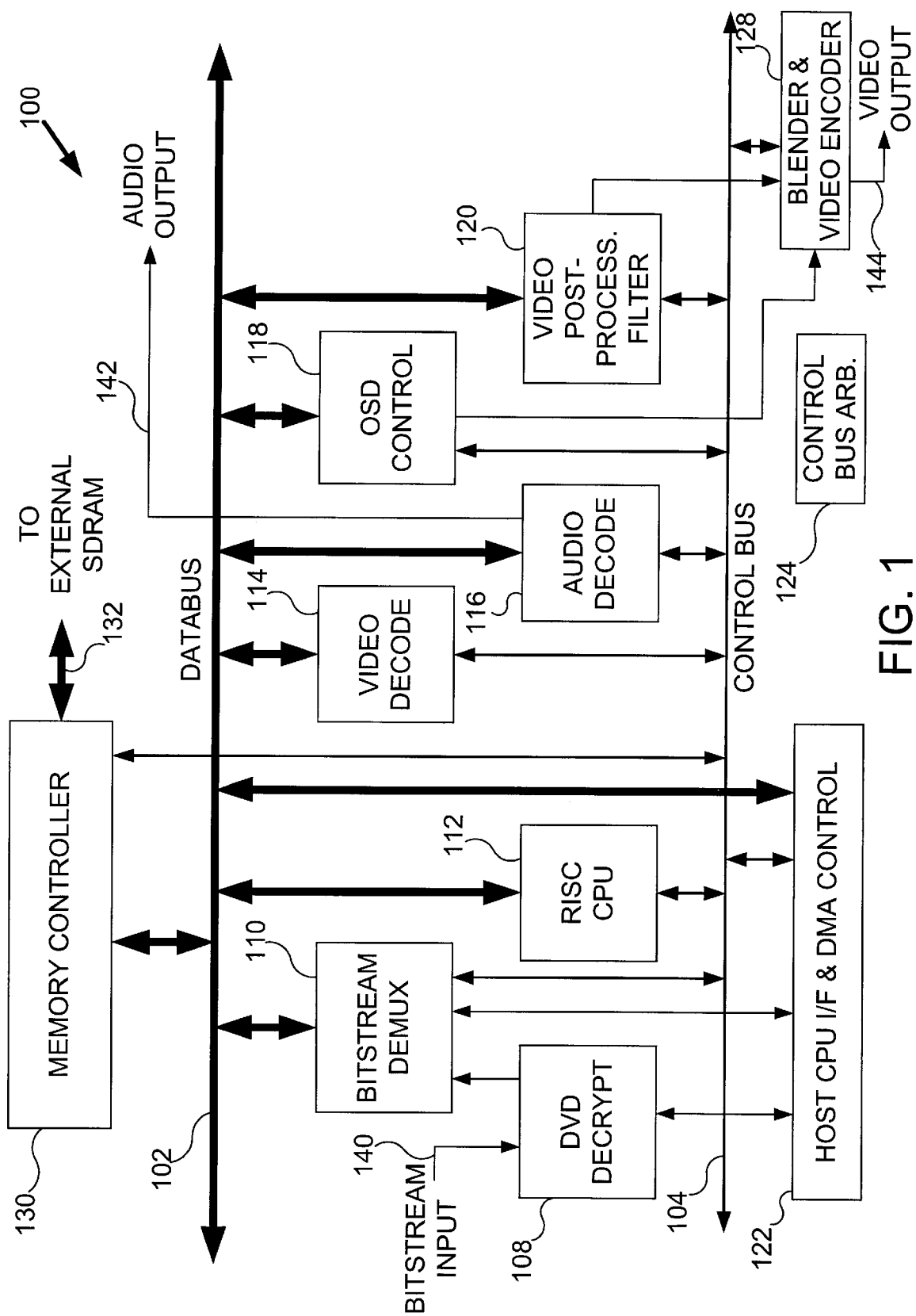
FIG. 1 is a block diagram for one embodiment of a controller for a digital audio and video player, in accordance with the present invention.

Referring now to FIG. 1, a block diagram for one embodiment of a controller 100 for a digital audio and video player is shown, in accordance with the present invention. However, alternate embodiments of the present invention may be used wherever there exists a necessity for frame and field write and read operations in a wide-word memory. Controller 100 may be used in conjunction with various electronic systems, including a digital video disk (DVD) player, or a digital video broadcast (DVB) set-top-box. Controller 100 preferably includes two primary data busses: databus 102 and control bus 104. Many of the functional units of controller 100 connect to both databus 102 and control bus 104. These functional units may include DVD decryption 108, bitstream demultiplexor 110, reduced-instruction-set-computer (RISC) central-processing-unit (CPU) 112, video decoder 114, audio decoder 116, on-screen-display (OSD) controller 118, video post-processing filter 120, host CPU interface and direct-memory-access (DMA) controller 122, control bus arbitrator 124, blender and video encoder 128, and memory controller 130.

In one embodiment of the present invention, databus 102 preferably transfers data in 64-bit wide-words (or eight 8-bit bytes) on 64 physical data lines. In alternate embodiments, the width of the wide-words may be 32 bits, 128 bits, or any other width necessitated by a given system architecture. The logical addressing space used to transfer data in 64-bit wide-words is called databus space. In one embodiment of the present invention, databus 102 may transfer compressed bitstreams, video reference and reconstructed pixel data, OSD graphics data, and several other data types between the functional units and external synchronous-dynamic-random-access-memory (SDRAM, not shown) via memory controller 130. In alternate embodiments, the memory may be of types other than SDRAM, such as static-random-access-memory (SRAM) or other forms of dynamic-random-access-memory (DRAM). Databus 102 also includes a 7-bit-wide channel address bus for determining the target of transfers when requested by numerous functional units.

Control bus 104 allows RISC CPU 112 or an external host CPU (not shown) to control the functional units by writing commands into read/write registers via host CPU interface and DMA controller 122. Control bus 104 preferably transfers data in 16-bit words on 16 physical data lines. Control bus arbitration 124 determines the order of transfers on control bus 104.

Control bus 104 may also transfer 32-bit addresses for use in databus 102 memory read and write operations in the form of two 16-bit words.

Memory controller 130 controls data transfers between the databus 102 and the external SDRAM. Memory controller 130 also controls databus 102. The detailed operation of memory controller 130 is further described below in conjunction with FIGS. 2 through 9.

Digital audio, digital video, and other digital data enters controller 100 at DVD decryption 108 via bitstream input signal 140. DVD decryption 108 decrypts copy-protected data when the bitstream is derived from a DVD. When the bitstream is derived from DVB, DVD decryption 108 passes the data through without alteration. In either case, the data is presented to bitstream demultiplexor 110 which parses the bitstream into digital audio, digital video, and other digital data. These individual parsed data types are then sent to external synchronous-dynamic-random-access-memory (SDRAM) (not shown) via databus 102, memory controller 130, and external SDRAM connection 136.

RISC CPU 112 communicates with, and controls, other functional units of controller 100 via databus 102 and control bus 104. RISC CPU 112 also communicates with an external CPU (not shown) via host CPU interface and DMA controller 122 for passing user interface data.

Video decoder 114 decompresses the compressed digital video data that is stored temporarily in external SDRAM (not shown), and sends the resulting decompressed digital video data to video post-processing filter 120. Audio decoder 116 likewise decompresses the compressed digital audio data, stored temporarily in external SDRAM, and sends the resulting decompressed digital audio data from controller 110 via audio output signal 142 in the form of multi-channel pulse-code-modulated (PCM) digital audio data.

Multi-function OSD controller 118 generates graphics patterns for superimposing over decoded video data, and additionally may produce sub-picture graphics such as floating cursors.

Video post-processing filter 120 resizes image data and also filters the image data for letterbox displays. As part of the resizing of image data, video post-processing filter 120 may need to convert frames of progressive-scan video (also called non-interlaced video) into fields of interlaced video. Video post-processing filter 120 additionally may change the chroma format and perform blending of four alpha planes.

Blender and video encoder 128 takes video data from OSD controller 118 and video post-processing filter 120, and combines the data to form the actual digital video signal to be displayed. Blender and video encoder 128 then encodes this actual digital video signal in one of several analog video signal formats, such as national television standards committee (NTSC) or phase alternate line (PAL), in either composite video or component video format.

Figure 2:
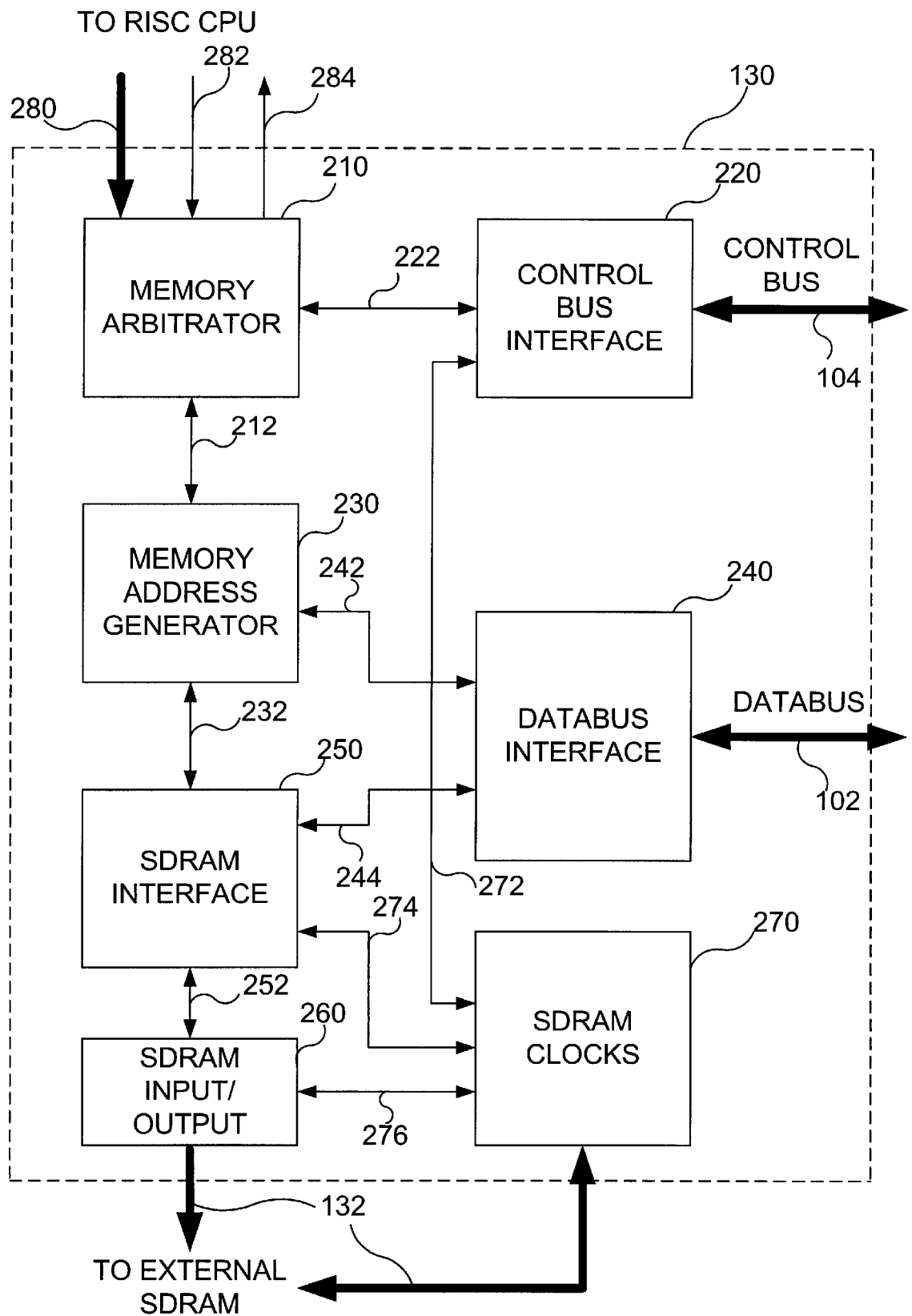
FIG. 2 is a block diagram for one embodiment of the memory controller of FIG. 1, in accordance with the present invention.

Referring now to FIG. 2, a block diagram for one embodiment of the memory controller 130 of FIG. 1 is shown, in accordance with the present invention. In the preferred embodiment, memory controller 130 primarily transfers 64-bit wide-word data from databus 102 to an external SDRAM (not shown) via 16-bit SDRAM connection 132. In one embodiment, databus 102 is clocked at 27 MHz and SDRAM connection 132 is clocked at 94.5 MHz. In alternate embodiments, the wide-words may be various other sizes, including 32 bits wide, 128 bits wide, or any other width necessitated by the system architecture. The physical memory connection may likewise be of any width.

Memory arbitrator 210 determines the order in which functional units attached to databus 102 may transfer data to or from SDRAM. The arbitration scheme used by memory arbitrator 210 to select that transfer order is configurable by registers which can be written via control bus 104. Control bus interface 220 receives configuration information from control bus 104 and transfers the configuration information to memory arbitrator 210.

Memory arbitrator 210 preferably also receives a 32-bit address on a private address bus connecting RISC CPU 112 to memory controller 130. The 32-bit address is a composite memory address, and, in alternate embodiments of the present invention, may contain more or fewer bits than 32. The private address bus includes direct-memory-access [DMA] address lines 280, DMA request line 282, and DMA busy line 284. When memory arbitrator 210 determines that a particular request for memory access should be granted, memory arbitrator 210 then delivers the 32-bit address and a respective channel number to memory address generator 230. (Each functional unit on databus 102 is preferably assigned a unique number, called a channel number, for data routing.) The 32-bit address delivered to memory address generator 230 contains a dynamic-random-access-memory-byte-address (DBA), and also a byte count field which shows how many bytes are to be transferred during the memory access. Details of the 32-bit address are discussed below in conjunction with FIG. 4A and FIG. 4B.

During a memory write cycle, memory address generator 230 generates one or more individual addresses onto signal line 232, and also generates an outgoing channel number signal on signal line 242, so that databus interface 240 may receive data words from the appropriate functional unit. Upon receipt of its corresponding channel number signal, the functional unit sends its data via databus 102 to write buffers in SDRAM interface 250. The addresses generated by memory address generator 230 expand the single incoming 32-bit address into a number of individual addresses. Each of these individual addresses specifies the location of a 64-bit wide-word in databus 102 virtual memory space.

The SDRAM used in the present invention need not be physically configured as a 64-bit wide-word memory. The SDRAM need only be virtually configured as 64-bit wide-word memory. In one embodiment, the SDRAM is physically configured as a 16-bit data word memory. SDRAM interface 250 transfers each 64-bit wide-word write datum from the write buffers in SDRAM interface 250 to SDRAM input/output 260 as four 16-bit words. SDRAM input/output 260 contains interface circuitry, including small buffers, to write the four 16-bit word transfers into SDRAM.

Referring now to FIG. 3, an exemplary memory configuration map is shown, in accordance with one embodiment of the present invention. The wide words are shown organized into pairs of columns, with an arbitrary fixed number (16) of rows. More pairs of columns may be added to the right of the memory configuration map of FIG. 3. In this manner the memory may be extended to any desired size.

Each box at an intersection of a row and column describes four contiguous bytes of memory. For example, the box at the intersection of row 350 and column 316 contains bytes whose addresses are 0ac hexadecimal (hex), 0ad hex, 0ae hex, and 0af hex.

In one embodiment of the present invention, a memory access method called "linear addressing" is used. Linear addressing views memory as a linear sequence of wide-words. Each pair of columns, 310 and 312, 314 and 316, 318 and 320, and 322 and 324, represents 16 contiguous 8-byte (64-bit) wide words in memory. For example, columns 310 and 312 describe the first 16 wide words of memory. Columns 314 and 316 represent the next 16 wide words of memory: the first address in column 314 is 1 greater than the last address in column 312. Details of the 32-bit address used in linear addressing are discussed below in conjunction with FIG. 4A.

In a second embodiment of the present invention, a memory access method called "reference addressing" is used. Reference addressing views memory as a set of 16 rows, as shown in FIG. 3. A memory read access using reference addressing returns the contents of the box described by the boundaries of the rows and columns indicated. For example, a memory access using reference addressing may indicate two rows, rows 340 and 342, and four columns, columns 310, 312, 314, and 316. In this example, the reference addressing access will return the 32-bit wide-words starting with byte addresses 000, 004, 008, 00c, 080, 084, 088, and 08c, sequentially. Reference addressing may be useful in cases where data corresponding to a video raster line is stored down a row in reference-address space organized memory. Details of the 32-bit address used in reference addressing are discussed below in conjunction with FIG. 4B.

Referring now to FIGS. 4A and 4B, a pair of 32-bit address 400, 440 bit allocation diagrams are shown, in accordance with two embodiments of the present invention. In these embodiments, 32-bit address 400 or 32-bit address 440 are composite memory addresses capable of controlling direct-memory-access (DMA) transfers. RISC CPU 112 may preferably send 32-bit address 400 or 32-bit address 440 via a private address bus to memory controller 130. The foregoing private address bus preferably includes DMA address lines 280, DMA request line 282, and DMA busy line 284. 32-bit address 400 and 32-bit address 440 preferably describe a requested read or write operation from a functional unit on databus 102 to SDRAM via memory controller 130. 32-bit address 400 and 32-bit address 440 preferably include three specific fields: dynamic-randomaccess-memory-byte-address (DBA) 404, flag bit 406, and a byte count field. In alternate embodiments of the present invention, other memory address bit allocations may be used.

DBA 404 contains a binary number that represents the individual byte address of a particular byte in memory. In the FIGS. 4A and 4B embodiments, DBA 404 represents the byte address of the first byte transferred during a requested memory operation. For DMA transfers, DBA 404 preferably is a byte address of a first byte of an 8-byte wide-word in memory. As an example, in the memory configuration map of FIG. 3, the value contained in DBA would be 038 hex for the first byte of the wide-word in the boxes at the intersection of row 354 and columns 310, 312.

32-bit addresses 400 and 440 contain an indicator that indicates the transfer type of the DMA transfer. In the FIGS. 4A and 4B embodiments, bit 22 of 32-bit addresses 400 and 440, called flag bit 406, preferably contains data which represents information concerning specific modes of a requested read or write operation. It may indicate from which of two registers to select a channel number for a DMA transfer. In these embodiments of the present invention, for the special case of read and write DMA transfers between external SDRAM and video post-processing filter 120, flag bit 406 preferably indicates whether the DMA transfer will be optimized for a frame-oriented procedure (called a frame transfer type) or for a field-oriented procedure (called a field transfer type). If flag bit 406 equals a binary 1, then the DMA transfer is optimized for a frame transfer type. Conversely, if flag bit 406 equals a binary 0, then the DMA transfer is optimized for a field transfer type. The details of these optimizations are discussed in detail below in conjunction, with FIGS. 6, 7, and 8.

32-bit addresses 400 and 440 preferably each contain a byte count field. A byte count field may contain information concerning how many bytes remain to be transferred in a particular DMA transfer. In the FIGS. 4A and 4B embodiments, the byte count field comprises bits 23 through 31 of corresponding 32-bit addresses 400 and 404.

In the FIG. 4A embodiment, the byte count field contains a number, (BC−1) 408, which preferably represents one fewer than the number of bytes remaining to be transferred in the requested memory operation. In the present embodiment, the value of (BC−1) is one less than a multiple of eight for a DMA transfer, because DMA transfers move 8-byte wide-words. The use of (BC−1) rather than simply the byte count simplifies the implementation.

In the FIG. 4B embodiment, the byte count field contains a pair of numbers, CX 442 and CY 444, which preferably represent the number of columns and rows, respectively, which are to be transferred in the present DMA transfer. If the number of columns to access is C, then CX 442 represents (C−1). If the number of rows to access is R, then CY 444 represents (2R−1).

Figure 5:
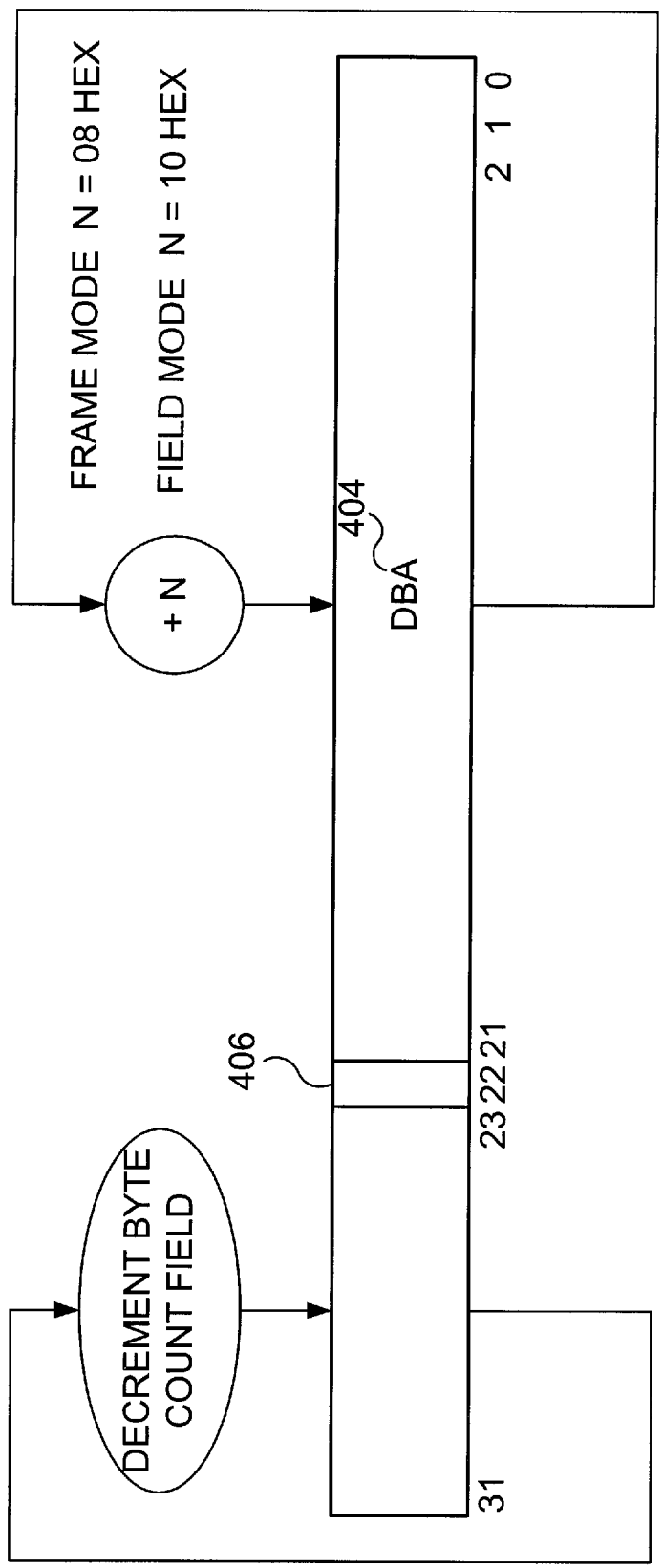
FIG. 5 is a diagram for updating the memory address bits of FIG. 4, in accordance with two embodiments of the present invention.

Referring now to FIG. 5, a diagram for updating the memory address bits of FIGS. 4A and 4B is shown, in accordance with two embodiment of the present invention. In the FIG. 5 embodiment, a transfer to or from memory is shown in the process carried out by memory address generator 230. Recall that memory address generator 230 receives 32-bit address 400 or 32-bit address 440 from memory arbitrator 210, and then generates a series of individual addresses for the requested memory. FIG. 5 illustrates how memory address generator 230 calculates the series of individual addresses.

When a memory write operation begins, memory address generator 230 transfers the contents of DBA 404 to SDRAM interface 250. SDRAM interface 250 then initiates four 16-bit data transfers to the eight physical bytes comprising the 64-bit wide-word whose address is the contents of DBA 404. After memory address generator 230 transfers the contents of DBA 404 to SDRAM interface 250, memory address generator 230 tests to see if the byte count field is exhausted. In the FIG. 4A embodiment, the byte count field is exhausted when the 6 most-significant bits of (BC−1) 408, bits 31 through 26 of 32-bit address 400, equal 0. In the FIG. 4B embodiment, the byte count field is exhausted when bits 31 through 24 of 32-bit address 440 equal 0.

If the byte count field is not exhausted, memory address generator 230 generates a subsequent individual address by adding a selectable number "N" hex to the current contents of DBA 404, and decrementing the byte count field. The new value of DBA 404 is then the address of the first byte to be transferred in the next 8-byte wide-word in memory. In one embodiment of the present invention, memory address generator 230 adds the number N=8 hex to the current contents of DBA 404 for DMA transfers between most functional units and external SDRAM. This advances the DBA 404 to the next 8-byte wide-word in memory.

In the special case of DMA transfers between video post-processing filter 120 and external SDRAM, if flag bit 406 equals 1, then memory address generator 230 adds the number N=8 hex to the current contents of DBA 404. Again this advances the DBA 404 to the next 8-byte wide-word in memory.

Conversely, if flag bit 406 equals 0, then memory address generator 230 adds the number N=10 hex to the current contents of DBA 404. Adding 10 hex to an address in the FIG. 3 memory map advances the addressed location 2 rows. As an example, consider the FIG. 3 wide-word beginning with the byte having address 038, located at the intersection of row 354 and columns 310, 312. Adding 10 hex to 038 yields 048. The byte having address 048 is in row 358, two rows down from the byte having address 038. In general, adding 10 hex to the current contents of DBA 404 advances the byte address contained within DBA 404 to the address of the second subsequent 8-byte wide-word in memory.

An additional complication arises in the FIG. 4B embodiment when the current value of DBA 404 corresponds to the last 32-bit wide-word of the current column. This condition is referred to as "column end". At column end, memory address generator 230 adds the constant N=8 hex (when flag bit 406 equals 1) or N=10 hex (when flag bit 406 equals 0) to the current value of DBA 404 in the manner described above. Then memory address generator 230 replaces the seven least-significant bits of DBA 404, bits 6 through 0, with the stored, original, value of bits 6 through 0 of DBA 404. Additionally, if the current column is an odd-numbered column, the logical value of bit 4 of DBA 404 is inverted. Memory address generator 230 then stores the resulting value in DBA 404. For clarity, this additional complication at column end in the FIG. 4B embodiment is not shown in FIG. 5.

After memory address generator 230 updates the contents of DBA 404, memory address generator 230 decrements the byte count field. In the FIG. 4A embodiment, memory address generator 230 decrements the byte count field, (BC−1) 408, by subtracting 8 hex from the current contents of (BC−1) 408. In the FIG. 4B embodiment, when not at column end, memory address generator 230 decrements the byte count field, CX 442 and CY 444, by subtracting 2 hex from the number contained in bits 31 through 23 of 32-bit address 440. When at column end, memory address generator 230 overwrites CY 444 with the stored, original value of CY, and subtracts 1 hex from CX 442.

In either case, after updating the contents of DBA 404, memory address generator 230 then sends the new contents of DBA 404 to SDRAM interface 250, which again initiates four 16-bit data transfers to the eight physical bytes comprising the 64-bit wide-word whose address begins at the new contents of DBA 404.

When the byte count field is exhausted, memory address generator 230 generates no subsequent individual address, and the DMA transfer operation ends.

Referring now to FIG. 6, a memory map for an exemplary frame access in the memory of FIG. 3 is shown, in accordance with the FIG. 4A embodiment of the present invention. A frame access for the FIG. 4B embodiment is similar. In other embodiments, the FIG. 3 wide-words could have widths other than 8-bytes, such as 4-bytes or 16-bytes. Additionally, in other embodiments the type of data transfer may be other than frame or field. In the FIG. 6 example, video post-processing filter 120 desires to read data corresponding to an MPEG-2 block which is processed for use as a frame in a progressive-scan display. An MPEG-2 block of 8-by-8 pixels is stored as an array of 8 bytes by 8 bytes in memory. In the FIG. 6 example, an MPEG-2 block includes 8-byte wide-words 610, 612, 614, 616, 618, 620, 622, and 624.

In order to read the 8-byte wide-words 610, 612, 614, 616, 618, 620, 622, and 624, RISC CPU 112 issues 32-bit address 400 with a byte count of 64 decimal (40 hex) and a first byte address of 000 hex. (BC–1) 408 thus equals 111111 binary, and DBA 404 equals 000 hex. Because this is a frame operation, flag bit 406 equals 1. Taking these values together, the 32-bit address 400 that initiates the DMA transfer equals 000111111100000000000000000000000 binary. Memory address generator 230 thus first sends an individual address of 000 hex to SDRAM interface 250. SDRAM interface 250 then retrieves the wide-word that contains the byte whose address is 000 hex, 8-byte wide-word 610.

Memory address generator 230 then subtracts 8 hex from (BC–1) 408, for a new value of (BC–1) 408 equaling 110111 binary. Memory address generator 230 also adds 8 hex to DBA 404, for a new value of DBA 404 equaling 008 hex. Memory address generator 230 then sends an individual address of 008 hex to SDRAM interface 250. SDRAM interface 250 finally retrieves the wide-word that contains the byte whose address is 008 hex, 8-byte wide-word 612.

Memory address generator 230 continues to subtract 8 hex from (BC–1) 408 and add 8 hex to DBA 404, each time sending the new value of DBA 404 to SDRAM interface 250 and thereby retrieving in sequence 8-byte wide-words 614, 616, 618, 620, 622, and 624. Immediately before retrieving 8-byte wide-word 624, memory address generator 230 subtracts 8 hex from a (BC–1) 408 value of 111 to yield a value of minus 1 (111111111 binary). (BC–1) 408 having a value less than 0 alerts memory address generator 230 that 8-byte wide-word 624 is the final wide-word of the DMA transfer. Once SDRAM interface 250 retrieves 8-byte wide-word 624, the FIG. 6 exemplary DMA transfer concludes.

Referring now to FIG. 7, a memory map for a first exemplary field access in the memory of FIG. 3 is shown, in accordance with the FIG. 4A embodiment of the present invention. A first field access for the FIG. 4B embodiment is similar. In alternate embodiments, the FIG. 3 wide-words could have widths other than 8-bytes, such as 4-bytes or 16 bytes. In other embodiments, the type of data transfer may be other than frame or field Additionally, other embodiments may advance from one wide-word access to another wide-word access within a field by advancing through memory addresses separated by more than two rows at a time. In the FIG. 7 example, video post-processing filter 120 desires to read data corresponding to an MPEG-2 block which is processed for use as a first field, defined as containing the odd scan lines, in an interlaced display. A first field MPEG-2 block of 8-by-8 pixels is stored as an array of 8 bytes by 8 bytes in memory. However, unlike the FIG. 6 example for frame use, the FIG. 7 array occupies alternate wide-words in memory. In the FIG. 7 example, a first field MPEG-2 block includes 8-byte wide-words 710, 712, 714, 716, 718, 720, 722, and 724.

In order to read the 8-byte wide-words 710, 712, 714, 716, 718, 720, 722, and 724, RISC CPU 112 issues 32-bit address 400 with a byte count of 64 decimal (40 hex) and a first byte address of 000 hex. (BC–1) 408 thus equals 111111 binary, and DBA 404 equals 000 hex. Because this is a field operation, flag bit 406 equals 0. Taking these values together, the 32-bit address 400 that initiates the DMA transfer equals a value of 000111111000000000000000000000000 binary. Memory address generator 230 thus first sends an individual address of 000 hex to SDRAM interface 250. SDRAM interface 250 then retrieves the wide-word that contains the byte whose address is 000 hex, 8-byte wide-word 710.

Memory address generator 230 then subtracts 8 hex from (BC–1) 408, for a new value of (BC–1) 408 equaling 110111 binary. Memory address generator 230 also adds 10 hex to DBA 404, for a new value of DBA 404 equaling 010 hex. Memory address generator 230 then sends an individual address of 010 hex to SDRAM interface 250. SDRAM interface 250 finally retrieves the wide-word that contains the byte whose address is 010 hex, 8-byte wide-word 712.

Memory address generator 230 continues to subtract 8 hex from (BC–1) 408 and add 10 hex to DBA 404, each time sending the new value of DBA 404 to SDRAM interface 250 and thereby retrieving in sequence alternating 8-byte wide-words 714, 716, 718, 720, 722, and 724. Immediately before retrieving 8-byte wide-word 724, memory address generator 230 subtracts 8 hex from a (BC–1) 408 value of 111 to yield a value of minus 1 (111111111 binary). (BC–1) 408 having a value that is less than 0 alerts memory address generator 230 that 8-byte wide-word 724 is the final wide-word of the DMA transfer. Once SDRAM interface 250 retrieves 8-byte wide-word 724, the FIG. 7 exemplary DMA transfer concludes.

Referring now to FIG. 8, a memory map for a second exemplary field access in the memory of FIG. 3, in accordance with the FIG. 4A embodiment of the present invention. A second field access for the FIG. 4B embodiment is similar. In other embodiments, the FIG. 3 wide-words could have widths other than 8-bytes, such as 4-bytes or 16-bytes. In other embodiments the type of data transfer may be other than frame or field Additionally, other embodiments may advance from one wide-word access to another wide-word access within a field by advancing through memory addresses separated by more than two rows at a time. In the FIG. 8 example, video post-processing filter 120 desires to read data corresponding to an MPEG-2 block which is displayed in an alternate field, in this case corresponding to the even scan lines, with respect to the foregoing example of FIG. 7. In the FIG. 8 example, a second field MPEG-2 block includes 8-byte wide-words 810, 812, 814, 816, 818, 820, 822, and 824.

In order to read the 8-byte wide-words 810, 812, 814, 816, 818, 820, 822, and 824, RISC CPU 112 issues 32-bit address 400 with a byte count of 64 decimal (40 hex) and a first byte address of 008 hex. (BC−1) 408 thus equals 111111 binary, and DBA 404 equals 008 hex. Because this is a field operation, flag bit 406 equals 0. Taking these values together, the 32-bit address 400 that initiates the DMA transfer equals a value of 00011111100000000000000000001000 binary. Memory address generator 230 thus first sends an individual address of 008 hex to SDRAM interface 250. SDRAM interface 250 then retrieves the wide-word that contains the byte whose address is 008 hex, 8-byte wide-word 810.

Memory address generator 230 then subtracts 8 hex from (BC−1) 408, for a new value of (BC−1) 408 equaling 110111 binary. Memory address generator 230 also adds 10 hex to DBA 404, for a new value of DBA 404 equaling 018 hex. Memory address generator 230 then sends an individual address of 018 hex to SDRAM interface 250. SDRAM interface 250 finally retrieves the wide-word that contains the byte whose address is 018 hex, 8-byte wide-word 812.

Memory address generator 230 continues to subtract 8 hex from (BC−1) 408 and add 10 hex to DBA 404, each time sending the new value of DBA 404 to SDRAM interface 250 and thereby retrieving in sequence alternating 8-byte wide-words 814, 816, 818, 820, 822, and 824. The FIG. 8 example thus describes a DMA transfer similar to that of FIG. 7, with the major difference being the starting value within DBA 404.

The discussions in conjunction with FIGS. 6, 7, and 8 above have shown how, in one embodiment of the present invention, a functional unit within controller 100 may either read or write from SDRAM utilizing either consecutive or alternating wide-words. This capability may thus support the efficient conversion of frame-organized data for progressive-scan video displays into pairs of field-organized data for interlaced video displays.

Figure 9:
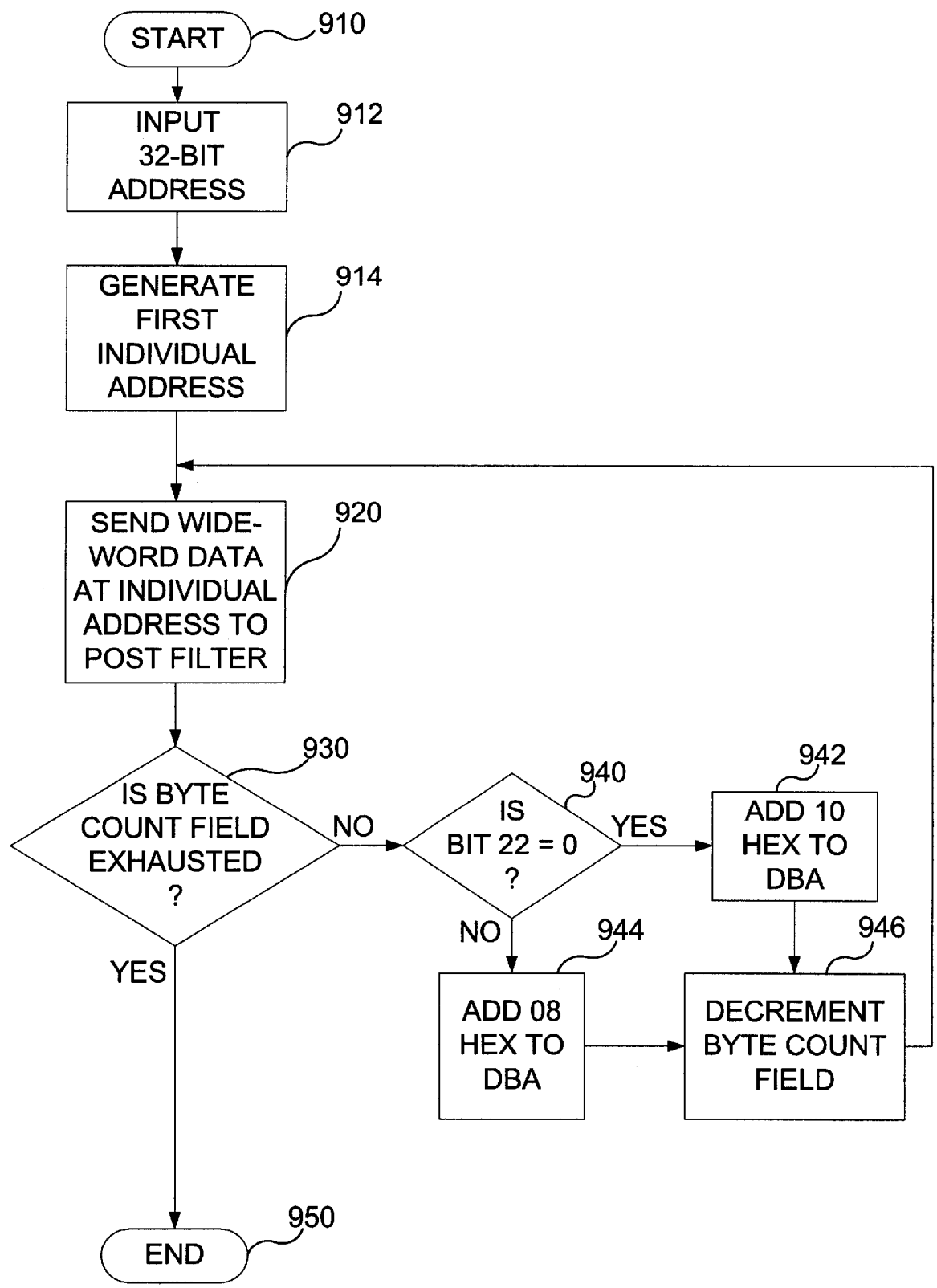
FIG. 9 is a flowchart showing method steps for performing frame and field memory accesses in a wide-word memory, in accordance with two embodiments of the present invention.

Referring now to FIG. 9, a flowchart showing method steps for performing frame and field memory access in a wide-word memory is shown, in accordance with two embodiments of the present invention. The FIG. 9 process illustrates a DMA transfer which reads from SDRAM into video post-process filter 120. For clarity, the FIG. 9 process has been simplified by omitting the discussion of the column end updating of DBA 404 in the FIG. 4B embodiment. However, in alternate embodiments the memory transfers may be between other kinds of memory devices and other kinds of functional units. Additionally, the functional units may be digital signal processor (DSP) CPUs or any other kind of circuitry.

In the FIG. 9 embodiment, initially, in step 912, RISC CPU 112 initiates a DMA transfer to video post-processing filter 120 by sending 32-bit address 400 to memory arbitrator 210. Then, in step 914, memory address generator 230 generates a first individual address based upon contents of DBA 404. In step 920, SDRAM interface 250 asserts the foregoing individual address generated by memory address generator 230, and sends a wide-word containing a byte addressed by the foregoing individual address to video post-processing filter 120.

In step 930 of the FIG. 9 embodiment, memory address generator 230 determines whether any additional wide-words remain to be transferred in the present DMA transfer by evaluating whether the byte count field is exhausted. The determination of whether the byte count field is exhausted is as given above in conjunction with FIG. 5 for the FIG. 4A and FIG. 4B embodiments. If so, then the DMA transfer is complete, and the FIG. 9 process ends. Conversely, in step 930, if the byte count field is not exhausted, then, in decision step 940, memory address generator 230 calculates the next individual address by determining whether the present DMA transfer is of frame or field type by testing whether bit 22 of 32-bit address 400 (flag bit 406) equals 0. If so, then the DMA transfer is of field type, and, in step 942, memory address generator 230 adds 10 hex to the current contents of DBA 404. Conversely, if, in decision step 940, flag bit 406 does not equal 0, then the DMA transfer is of frame type, and, in step 944, memory address generator 230 adds 08 hex to the current contents of DBA 404. Both steps 942 and 944 then proceed to step 946, in which memory address generator 230 decrements the byte count field. Memory address generator 230 decrements the byte count field as discussed above in conjunction with FIG. 5 for the FIG. 4A and FIG. 4B embodiments.

After memory address generator 230 has calculated the next individual address in steps 940, 942, 944, and 946, then the FIG. 9 process returns to step 920. Again, in step 920, SDRAM interface 250 asserts a new individual address generated by memory address generator 230, and sends a new wide-word containing a byte addressed by the new individual address to video post-processing filter 120. This process of repeatedly generating new individual addresses and then reading from memory repeats through steps 920, 930, 940, 942, 944, and 946, until, in decision step 930, memory address generator 230 determines there are no additional wide-words to be transferred in the present DMA transfer. Decision step 930 then exits via the no branch, and the FIG. 9 process terminates.

The FIG. 9 embodiment illustrates a memory read DMA transfer. The process is similar for a memory write DMA transfer, except that step 920 is replaced with a memory write step to a wide-word containing a byte addressed by the individual address from video post-process filter 120.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing data transfers, comprising:
   a composite memory address including an indicator configured to indicate a transfer type of said data transfers; and
   a memory address generator configured to generate a plurality of individual addresses from said composite memory address.

2. The system of claim 1 wherein said system is in an integrated circuit controller for digital video information.

3. The system of claim 1 wherein said data transfers are direct memory access transfers.

4. The system of claim 3 wherein said transfer type of said data transfers is a frame transfer.

5. The system of claim 4 wherein said indicator configured to indicate said transfer type of said data transfers includes a flag bit.

6. The system of claim 5 wherein said composite memory address includes a byte address.

7. The system of claim 3 wherein said transfer type of said data transfers is a field transfer.

8. The system of claim 7 wherein said indicator configured to indicate said transfer type of said data transfers includes a flag bit.

9. The system of claim 8 wherein said composite memory address includes a byte address.

10. The system of claim 3 wherein said composite memory address includes a byte count.

11. A system for performing data transfers, comprising:
a composite memory address including an indicator configured to indicate a transfer type of said data transfers; and
a memory address generator configured to generate a plurality of individual addresses from said composite memory address, wherein said data transfers are direct memory access transfers, said transfer type of said data transfers is a frame transfer, said indicator configured to indicate said transfer type of said data transfers includes a flag bit, said composite memory address includes a byte address, and said memory address generator adds a first constant to said byte address.

12. The system of claim 11 wherein said first constant equals 8 hexadecimal.

13. A system for performing data transfers, comprising:
a composite memory address including an indicator configured to indicate a transfer type of said data transfers; and
a memory address generator configured to generate a plurality of individual addresses from said composite memory address, wherein said data transfers are direct memory access transfers, said transfer type of said data transfers is a field transfer, said indicator configured to indicate said transfer type of said data transfers includes a flag bit, said composite memory address includes a byte address, and said memory address generator adds a first constant to said byte address.

14. The system of claim 13 wherein said first constant equals 10 hexadecimal.

15. The system of claim 12 wherein said plurality of said individual addresses of said field transfer address a plurality of alternate wide-words in a memory.

16. The system of claim 15 wherein said plurality of said alternate wide-words in said memory include odd scan-line data.

17. The system of claim 15 wherein said plurality of said alternate wide-words in said memory include even scan-line data.

18. A system for performing data transfers, comprising:
a composite memory address including an indicator configured to indicate a transfer type of said data transfers; and
a memory address generator configured to generate a plurality of individual addresses from said composite memory address, wherein said data transfers are direct memory access transfers, said composite memory address includes a byte count, and said memory address generator subtracts a second constant from said byte count.

19. The system of claim 18 wherein said second constant equals 8 hexadecimal.

20. A method for performing data transfers, comprising the steps of:
indicating a transfer type of said data transfers within a composite memory address; and
generating a plurality of individual addresses from said composite memory address with a memory address generator.

21. The method of claim 20 wherein said method is performed within an integrated circuit controller for digital video information.

22. The method of claim 20 wherein said data transfers are direct memory access transfers.

23. The method of claim 22 wherein said transfer type of said data transfers is a frame transfer.

24. The method of claim 23 wherein said step of indicating said transfer type of said data transfers utilizes a flag bit.

25. The method of claim 24 wherein said composite memory address includes a byte address.

26. The method of claim 22 wherein said transfer type of said data transfers is a field transfer.

27. The method of claim 26 wherein said step of indicating said transfer type of said data transfers utilizes a flag bit.

28. The method of claim 27 wherein said composite memory address includes a byte address.

29. The method of claim 22 wherein said composite memory address includes a byte count.

30. A method for performing data transfers, comprising the steps of:
indicating a transfer type of said data transfers within a composite memory address; and
generating a plurality of individual addresses from said composite memory address with a memory address generator, wherein said data transfers are direct memory access transfers, said transfer type of said data transfers is a frame transfer, said step of indicating said transfer type of said data transfers includes a flag bit, said composite memory address includes a byte address, and said memory address generator adds a first constant to said byte address.

31. The method of claim 30 wherein said first constant equals 8 hexadecimal.

32. A method for performing data transfers, comprising the steps of:
indicating a transfer type of said data transfers within a composite memory address; and
generating a plurality of individual addresses from said composite memory address with a memory address generator, wherein said data transfers are direct memory access transfers, said transfer type of said data transfers is a field transfer, said step of indicating said transfer type of said data transfers includes a flag bit, said composite memory address includes a byte address, and said memory address generator adds a first constant to said byte address.

33. The method of claim 32 wherein said first constant equals 10 hexadecimal.

34. The method of claim 33 wherein said plurality of said individual addresses of said field transfer address a plurality of alternate wide-words in a memory.

35. The method of claim 34 wherein said plurality of said alternate wide-words in said memory include odd scan-line data.

36. The method of claim 34 wherein said plurality of said alternate wide-words in said memory include even scan-line data.

37. A method for performing data transfers, comprising the steps of:
indicating a transfer type of said data transfers within a composite memory address; and
generating a plurality of individual addresses from said composite memory address with a memory address generator, wherein said data transfers are direct memory access transfers, said composite memory address includes a byte count, and said memory address generator subtracts a second constant from said byte count.

38. The method of claim 37 wherein said second constant equals 8 hexadecimal.

39. A system for performing data transfers, comprising:

means for indicating a transfer type of said data transfers within a composite memory address; and means for generating a plurality of individual addresses from said composite memory address with a memory address generator.

40. A computer-readable medium comprising program instructions for performing data transfers, by performing the steps of:

indicating a transfer type of said data transfers within a composite memory address; and generating a plurality of individual addresses from said composite memory address with a memory address generator.

\* \* \* \* \*